United States Patent
Weyer

(10) Patent No.: US 10,628,111 B2
(45) Date of Patent: Apr. 21, 2020

(54) METHOD AND APPARATUS FOR OPTICALLY CONCEALING VIDEO WALL SEAMS

(71) Applicant: Frank Michael Weyer, Los Angeles, CA (US)

(72) Inventor: Frank Michael Weyer, Los Angeles, CA (US)

( * ) Notice: Subject to any disclaimer, the term of this patent is extended or adjusted under 35 U.S.C. 154(b) by 97 days.

(21) Appl. No.: 15/782,706

(22) Filed: Oct. 12, 2017

(65) Prior Publication Data

US 2018/0129465 A1  May 10, 2018

Related U.S. Application Data

(60) Provisional application No. 62/419,326, filed on Nov. 8, 2016.

(51) Int. Cl.
*G06F 3/14* (2006.01)
*G02B 25/00* (2006.01)

(52) U.S. Cl.
CPC ......... *G06F 3/1446* (2013.01); *G02B 25/002* (2013.01); *G09G 2300/026* (2013.01); *G09G 2340/045* (2013.01)

(58) Field of Classification Search
None
See application file for complete search history.

(56) References Cited

U.S. PATENT DOCUMENTS

| 5,695,346 A | * | 12/1997 | Sekiguchi | .......... | G02B 27/2214 40/436 |
| 2013/0279012 A1 | * | 10/2013 | Lee | .......... | G02B 3/0037 359/622 |
| 2014/0218918 A1 | * | 8/2014 | Moriwaki | .......... | H04N 5/64 362/237 |
| 2015/0097837 A1 | * | 4/2015 | Jepsen | .......... | G06F 3/1446 345/428 |

\* cited by examiner

*Primary Examiner* — William R Alexander
*Assistant Examiner* — Gary W O'Neill
(74) *Attorney, Agent, or Firm* — TECHCOASTLAW

(57) ABSTRACT

The present invention comprises a device and method that reduces the appearance of inter-monitor seams by optically magnifying display areas on each side of a seam such that they appear to extend beyond the display area of a monitor so as to give the visual appearance of extending to the outside edge of each monitor's frame. In one embodiment, the invention comprises a clear longitudinal magnifying strip comprising a generally bi-semicircular cross section that is mounted across an inter-monitor seam. In one embodiment, the invention comprises a video processor that adjusts the image displayed on a monitor to compensate for the visual distortion caused by the magnifying strip.

5 Claims, 7 Drawing Sheets

METHOD AND APPARATUS FOR OPTICALLY CONCEALING VIDEO WALL SEAMS

CROSS-REFERENCE TO RELATED PATENT APPLICATIONS

The present application claims the benefit of and priority to and from U.S. Provisional Patent Application No. 62/419,326 filed Nov. 8, 2016, which is incorporated in its entirety by reference herein.

FIELD OF THE INVENTION

The present invention relates to the field of video walls and other multi-monitor display systems.

BACKGROUND OF THE INVENTION

Video walls and other multi-monitor display systems create large video displays by arranging multiple display screens adjacent to each other, and then displaying images that extend across the adjacent display screens. While such video walls are able to create large display surfaces, the displays have unsightly, usually black appearing seams between the individual monitors, created by the monitor frames. While there have been reductions in the thickness of frames that surround a display monitor's display area, even thin frames result in an unsightly grid of seams in video wall and other multi-monitor display systems.

There remains a need for a method and apparatus for reducing the unpleasant visual appearance of seams between monitors in video walls and multi-monitor displays.

SUMMARY OF THE INVENTION

The present invention reduces the appearance of inter-monitor seams by optically magnifying display areas on each side of a seam such that they appear to extend beyond the display area of a monitor so as to give the visual appearance of extending to the outside edge of each monitor's frame. In one embodiment, the invention comprises a clear longitudinal magnifying strip comprising a generally bi-semicircular cross section that is mounted across an inter-monitor seam. In one embodiment, the invention comprises a video processor that adjusts the image displayed on a monitor to compensate for the visual distortion caused by the magnifying strip.

DETAILED DESCRIPTION OF THE INVENTION

In the following description, numerous specific details are set forth to provide a thorough description of the invention. However, it will be apparent to those of ordinary skill in the art that the invention may be practiced without these specific details. In other instances, well-known features have not been described in detail so as not to obscure the invention.

Figure 1:
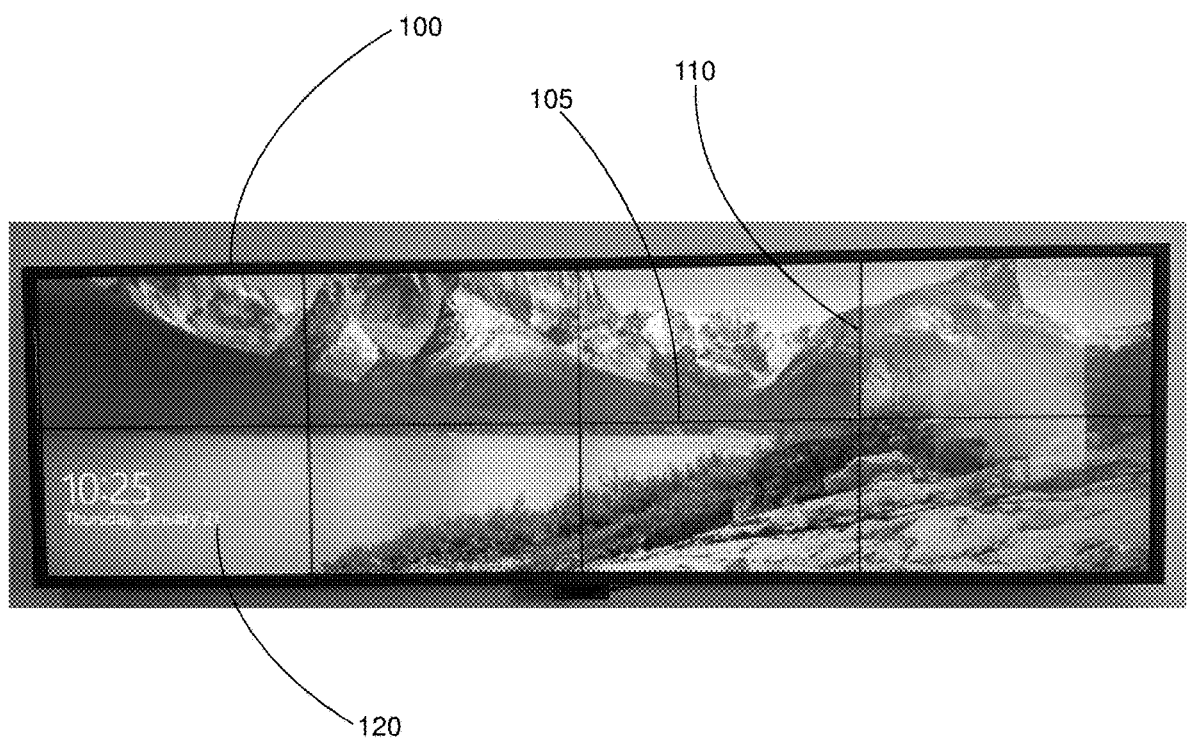
FIG. 1 shows an example of a prior art video wall.

FIG. 1 shows an example of a video wall 100 of the prior art that consists of a 2 by 4 array of individual video monitors 120 mounted immediately adjacent to each other. As shown in FIG. 1, video wall 100 displays an image that stretches across all monitors of video wall 100. As shown in FIG. 1, the frames of individual monitors 120 produce unsightly horizontal and vertical seams 105 and 110, respectively.

Figure 2:
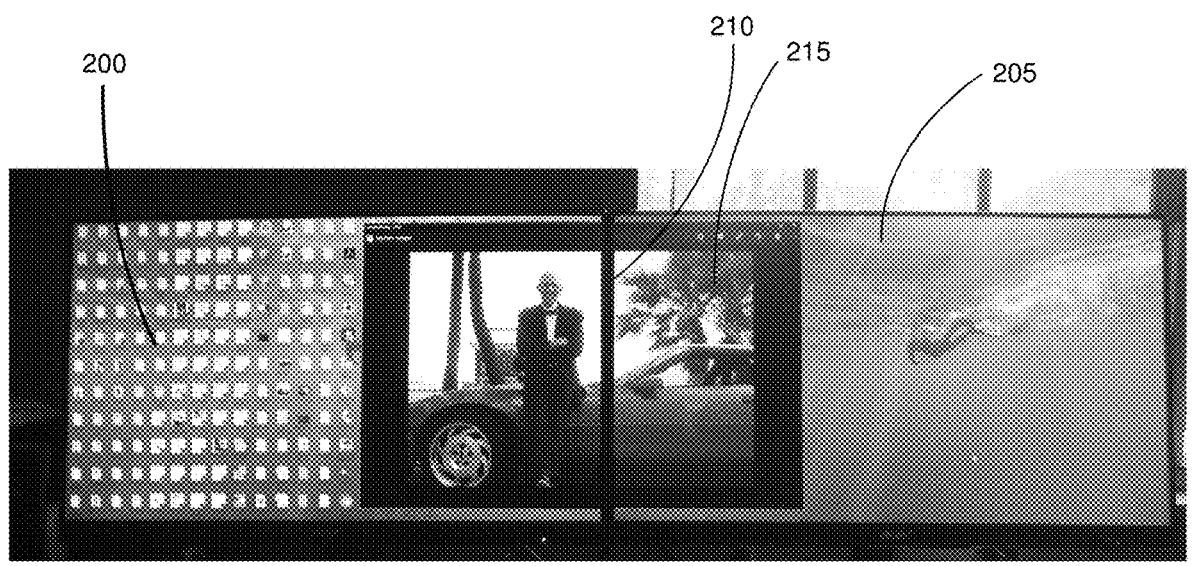
FIG. 2 is a photograph of two adjacent prior art video monitors of the prior art showing the seam caused by each monitor's frame.

FIG. 2 shows two prior art video monitors 200 and 205 disposed immediately adjacent to each other. An image 215 is positioned such that it extends across both monitors. As shown in FIG. 2, the frames of video monitors 200 and 205 cause an unsightly seam 210 through image 215.

Figure 3:
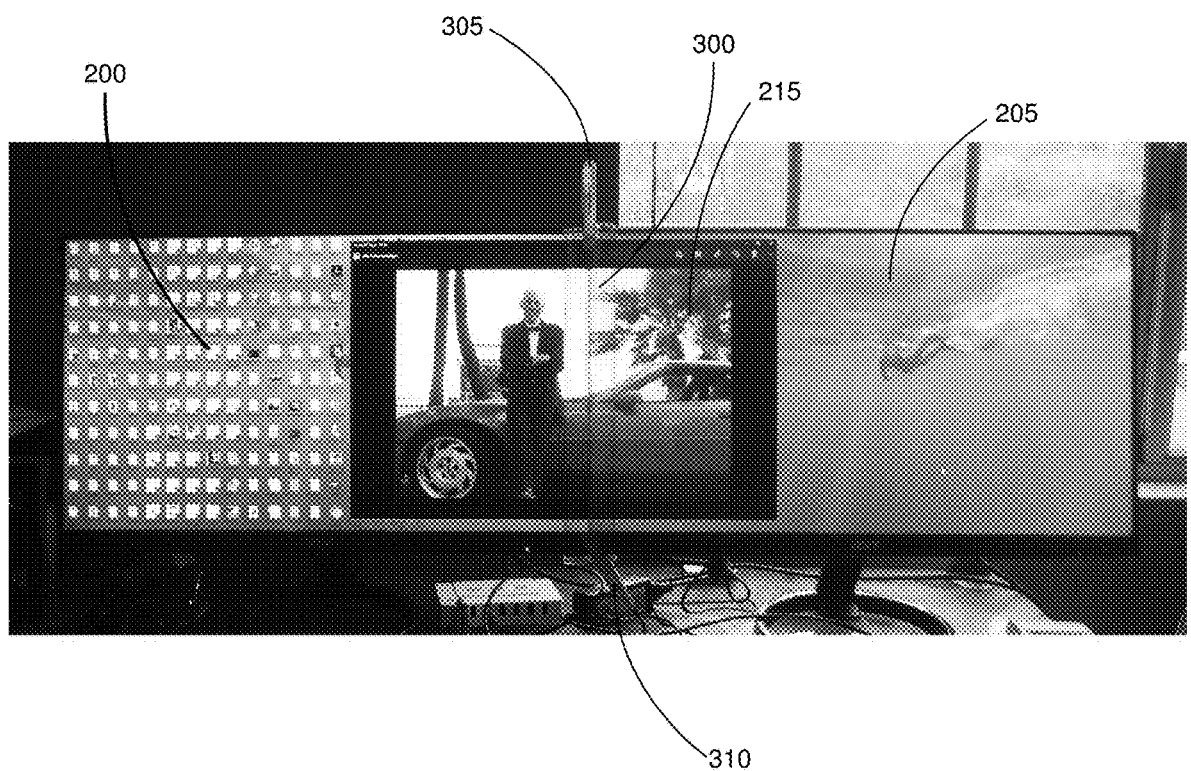
FIG. 3 is a photograph showing an embodiment of the magnifying strip of the invention used with the video monitors of FIG. 2.

FIG. 3 shows the video monitors 200 and 205 to which an embodiment of the magnifying strip 300 of the invention has been attached using two plastic spring clamps 305 and 310. As shown in FIG. 3, magnifying strip 300 has effectively concealed seam 210 of FIG. 2.

Figure 4:
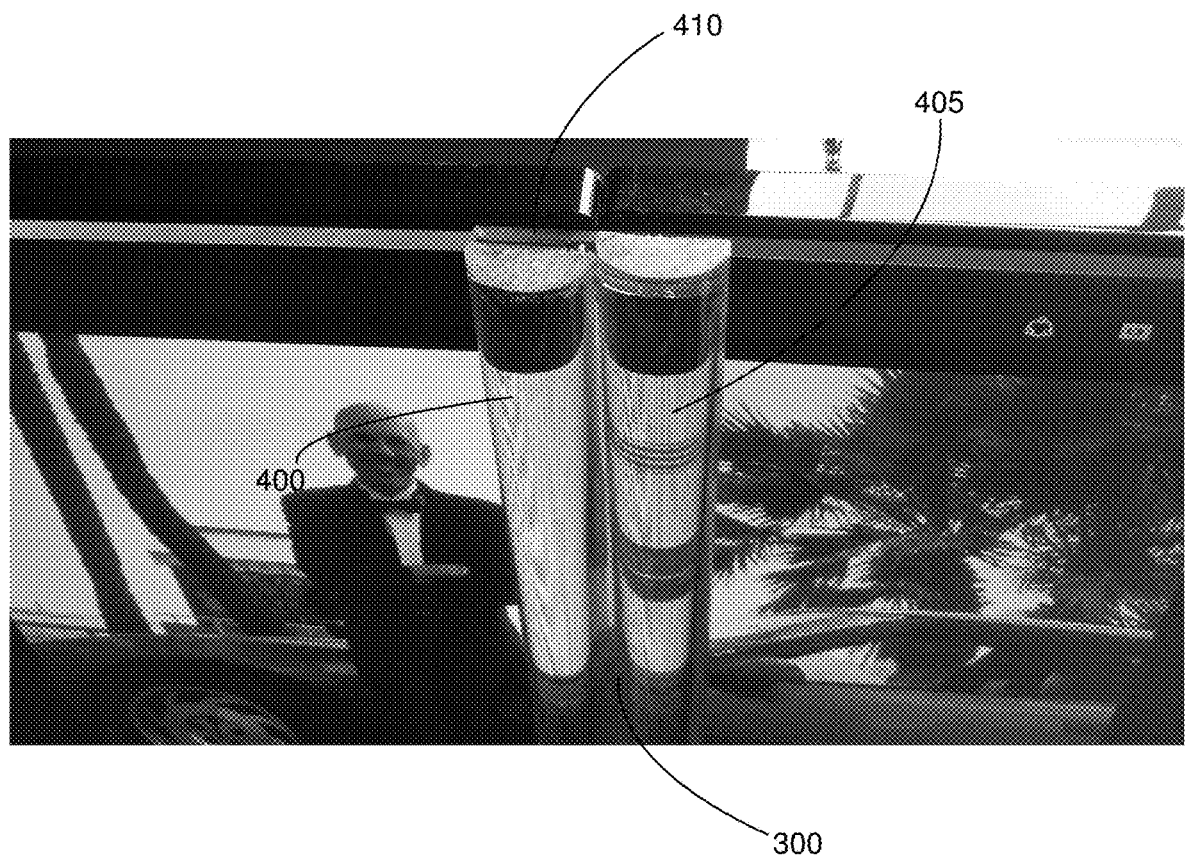
FIG. 4 is a photograph showing a top perspective view of the embodiment of the magnifying strip of FIG. 3.

FIG. 4 is a top perspective view of magnifying strip 300 of FIG. 3. As shown in FIG. 4, magnifying strip 300 comprises two adjacent acrylic half-round rods 400 and 405 and a square rod 410. In one embodiment, half-round rods 400 and 405 are each acrylic rods having a diameter (width) of approximately one inch and a radius (thickness) of one-half inch, while square rod 410 has a height and width of one-quarter inch. In one embodiment, magnifying strip was constructed by gluing the tops of half-round rods to horizontally disposed square rod 410 using acrylic adhesive.

Figure 5:
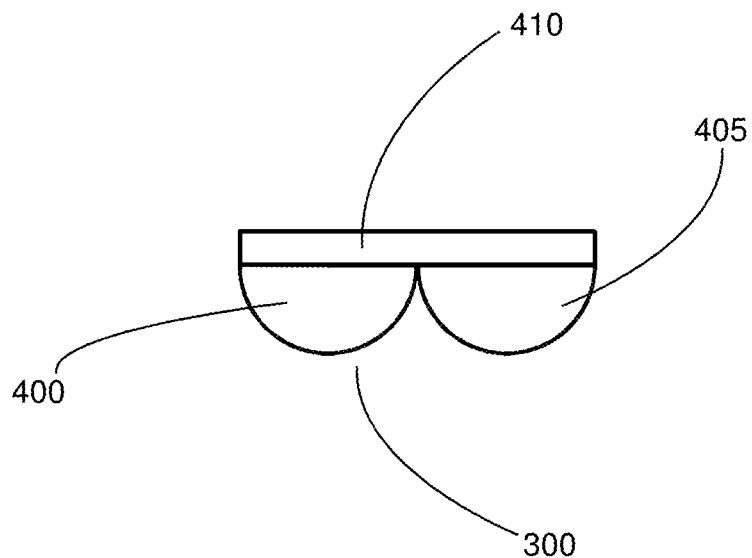
FIG. 5 is a drawing showing the cross-section of an embodiment of the optical magnifying strip of the invention.

FIG. 5 is a cross sectional view showing the resulting arrangement of half-round rods 400 and 405 and square rod 410. A piece of square rod similar to square rod 410 was also glued to the bottoms of half-round rods 405 and 410.

Figure 6:
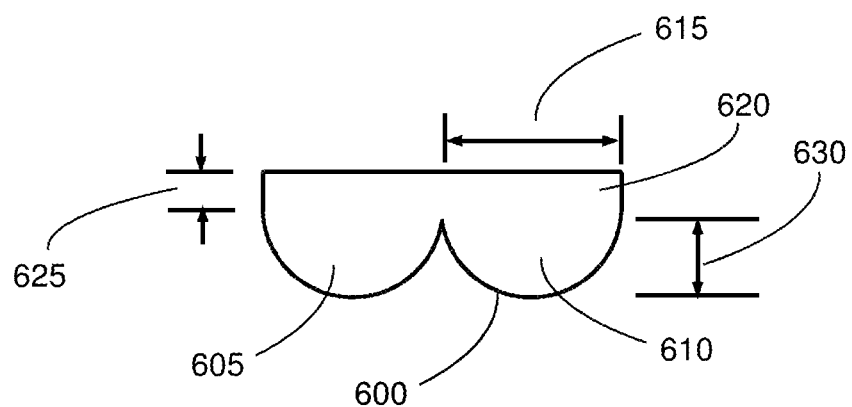
FIG. 6 is a drawing showing the cross-section of an embodiment of the optical magnifying strip of the invention.

FIG. 6 shows a cross-sectional profile 600 of one or more embodiments of the magnifying strip of the invention. In one or more embodiments, the magnifying strip of the invention may be produced by extruding clear acrylic or other clear material through a die having the desired cross sectional profile, as, for example, profile 600.

As shown in FIG. 6, cross-sectional profile 600 comprises two adjacent generally semicircular or convex portions 605 and 610 each have a width 615 and a height 630 (in the case of semicircular portions, height 630 will be approximately one-half of width 615) and generally rectangular base portion 620 having a thickness 625. Varying the dimensions 615, 625, and 630 will alter the optical characteristics (e.g. magnification and distortion) as will be known to those of skill in the art.

Figure 7:
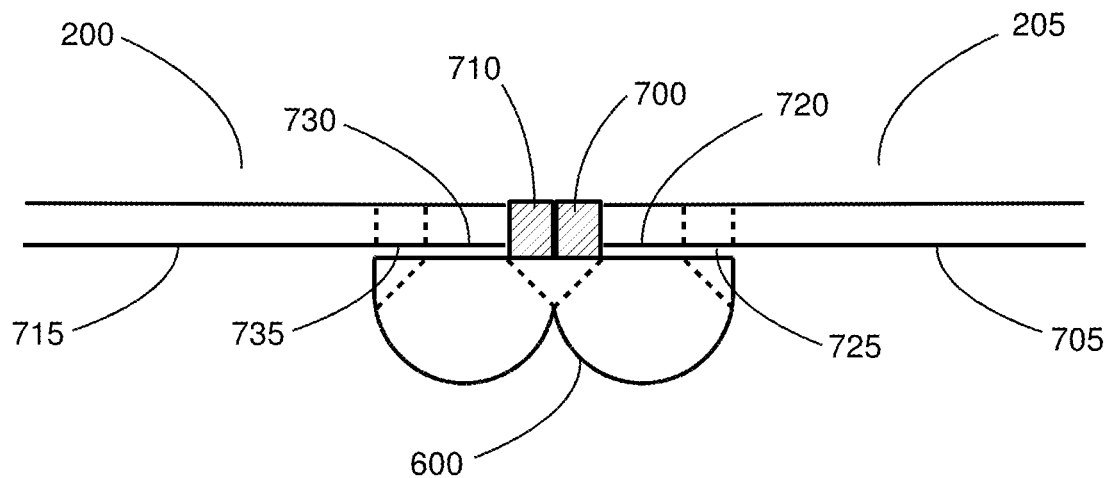
FIG. 7 is a cross-sectional diagram explaining the operation of the optical magnifying strip of the invention.
Figure 8:
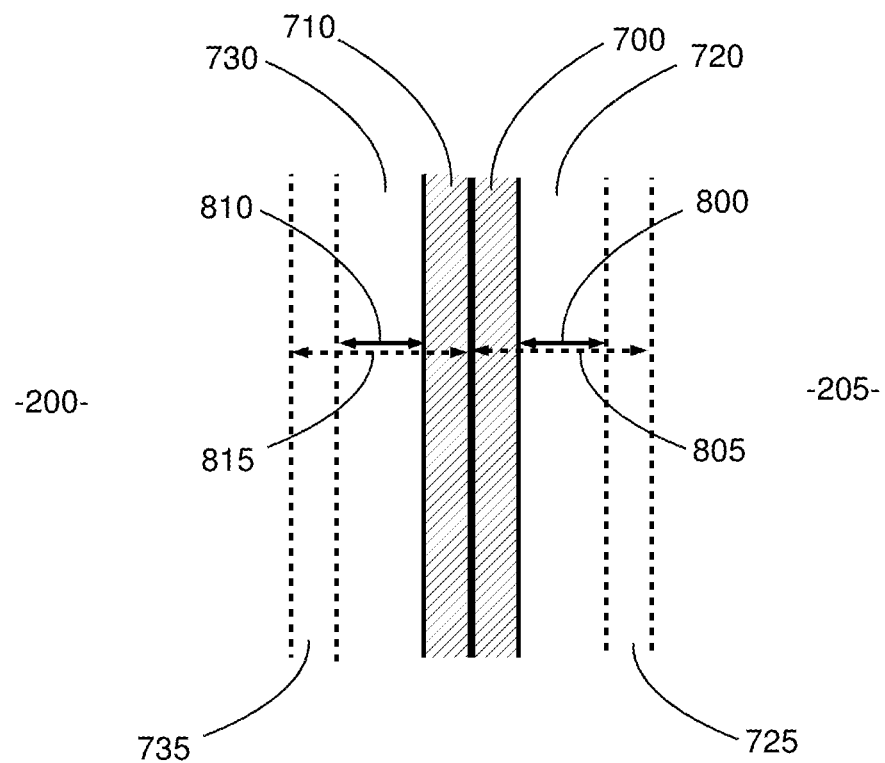
FIG. 8 is a front view diagram explaining the operation of the optical magnifying strip of the invention.

FIGS. 7 and 8 illustrate how the magnifying strip of the invention conceals seams created by frames of adjacent monitors in video walls and other multi-monitor displays. FIG. 7 is a top cross sectional view of adjacent portions of two video monitors, such as video monitors 200 and 205 of FIGS. 2 and 3. In FIG. 7, item 710 represents the frame and item 715 the display area of video monitor 200, and item 700 represents the frame and item 705 the display area of video monitor 205. Magnifying strip 600 is placed such that it is generally centered over frames 700 and 710.

In the configuration of magnifying strip 300 of FIG. 5, each cylindrical half-round rod 400 and 405 as mounted to square rod 410, if placed adjacent to video monitors 200 and 205 as shown in FIG. 7, produces a magnification of approximately 2×. That is, having a width each of approximately one inch, each semicircular half of magnifying strip 300 magnifies an approximately half-inch wide strip of the monitor display area under its center line (i.e. portions 720 and 730 in FIGS. 7 and 8) to extend across its upper approximately one inch wide outer surface. That is, as shown in FIG. 8, the left half of magnifying strip 300 magnifies and expands display area portion 730 of video monitor 200 (having the width of arrow 810) to extend across and conceal frame 710 as well as display area portion 735 (having the total magnified width of arrow 815) of monitor 200. Similarly, the right half of magnifying strip 300 magnifies and expands display area portion 720 of video monitor 205 (having the width of arrow 800) to extend across and conceal frame 700 as well as display area portion 725 (having the total magnified width of arrow 805) of monitor 205. Magnifying strip 300 thereby visually conceals the inter-monitor seam formed by frames 700 and 710, as well as display area portions 725 and 735, with the magnified display area portions 720 and 730 (which will be referred to herein as the "focal areas" of magnifying strip 300.

Because the magnifying strip of the invention magnifies portions of the displays on each side of the seam created by the frames of adjacent monitors, there is some optical distortion. The distortion includes that the magnified portion of the image is bigger than the original, unmagnified image. In addition, the magnified portion of the image obsures portions of the original image that are disposed directly under the magnifying strip (e.g. portions 720 and 730 of FIGS. 7 and 8.

The intended, undistorted result is for the original image to extend unbroken and undistorted across the adjacent monitor frames (e.g. frames 700 and 710 of FIGS. 7 and 8). That result can be achieved by pre-processing of the image to be displayed.

Figure 9:
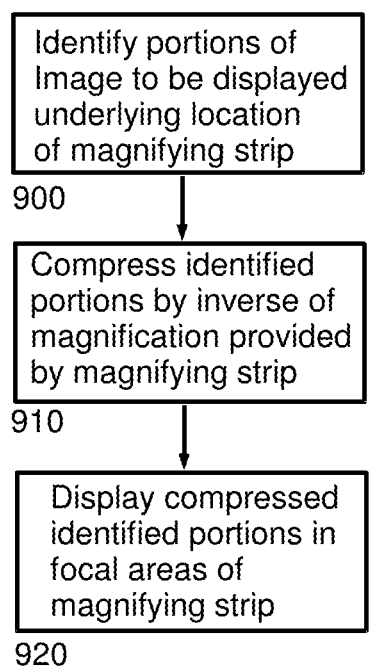
FIG. 9 is a flow chart showing steps in a process for compensating for optical extortion in one or more embodiments of the invention.

FIG. 9 is a flow chart showing a process for compensating for distortion in one or more embodiments of the invention. As shown in FIG. 9, at step 900 the portions of the original image that will underlie the location where the magnifying strip will be disposed are identified (e.g. the portion of the image that would lie in strips having widths 805 and 815 in FIG. 8 if the image extended seamlessly and undistorted from monitor 200 to monitor 205). At step 910, each of the identified portions are compressed by a factor that is the inverse of the magnification provided by the magnifying strip. For the embodiment of FIGS. 3 and 4 that has a magnification of 2×, the portions would be compressed to half their respective widths (e.g. widths 800 and 810 in FIG. 8). At step 920, the compressed portions are then displayed under the respective focal areas of the two halves of the magnifying strip (e.g. areas 720 and 730 of FIG. 8). Magnifying strip then magnifies the compressed portions back to their original sizes, and displays them at their original positions, obscuring and concealing the inter-monitor seam.

Thus, a novel method and apparatus for concealing unsightly seams between adjacent video monitors in video wall and other multi-monitor display systems has been presented. Although the invention has been described using specific example embodiments, those of ordinary skill in the art will understand that the invention is not limited to the specific example embodiments described herein. Other embodiments will be apparent to those skilled in the art.

The invention claimed is:

1. An optically magnifying longitudinal strip configured to optically conceal a seam between adjacent video displays having a length comprising a constant cross-section along said length, said constant cross-section consisting of first and second generally semicircular portions, said first generally semicircular portion immediately adjacent to and integrally formed with said second generally semicircular portion, and a generally rectangular portion immediately adjacent to and integrally formed with said first and second semicircular portions.

2. The optically magnifying longitudinal strip of claim 1 wherein said first generally semicircular portion is configured to conceal a first portion of said seam formed by a frame of a first of said video displays and said second semicircular portion is configured to conceal a second portion of said seam formed by a frame of a second of said video displays.

3. The optically magnifying longitudinal strip of claim 2 formed by extrusion.

4. The optically magnifying longitudinal strip of claim 3 formed from extruded acrylic.

5. The optically magnifying longitudinal strip of claim 1 configured to be removably attached to said video displays.

\* \* \* \* \*